US012637813B2

(12) United States Patent  (10) Patent No.: US 12,637,813 B2
Hofmann  (45) Date of Patent: May 26, 2026

(54) METHOD FOR REPROFILING AT LEAST ONE SWITCH BLADE IN POINTS LAID IN A RAILWAY TRACK

(71) Applicant: MATE GmbH, Kirchham bei Vorchdorf (AT)

(72) Inventor: Stefan Hofmann, Steyrermuehl (AT)

(73) Assignee: MATE GmbH, Kirchham bei Vorchdorf (AT)

( * ) Notice: Subject to any disclaimer, the term of this patent is extended or adjusted under 35 U.S.C. 154(b) by 444 days.

(21) Appl. No.: 18/287,830

(22) PCT Filed: Apr. 19, 2022

(86) PCT No.: PCT/AT2022/060124
§ 371 (c)(1),
(2) Date: Oct. 20, 2023

(87) PCT Pub. No.: WO2022/221898
PCT Pub. Date: Oct. 27, 2022

(65) Prior Publication Data
US 2024/0183115 A1    Jun. 6, 2024

(30) Foreign Application Priority Data
Apr. 21, 2021   (AT) ............................... A 50294/2021

(51) Int. Cl.
*E01B 31/13*      (2006.01)
*B23C 1/20*       (2006.01)
(Continued)

(52) U.S. Cl.
CPC ................ *E01B 31/13* (2013.01); *B23C 1/20* (2013.01); *B23C 3/005* (2013.01); *E01B 31/18* (2013.01);
(Continued)

(58) Field of Classification Search
CPC ........ E01B 31/12–31/175; Y10T 409/306384; Y10T 409/30644; Y10T 409/303752;
(Continued)

(56) References Cited

U.S. PATENT DOCUMENTS 4,615,150 A * 10/1986 Panetti .................... E01B 31/17
451/69
4,908,993 A    3/1990 Buhler
(Continued)

FOREIGN PATENT DOCUMENTS

DE    202007016721 U1    3/2008
DE    102010022419 A1    12/2011
(Continued)

OTHER PUBLICATIONS

International Search Report for PCT/AT2022/060124 mailed Aug. 22, 2022.

*Primary Examiner* — Erica E Cadugan
(74) *Attorney, Agent, or Firm* — Collard & Roe, P.C.

(57)          ABSTRACT

A method for reprofiling a switch blade of a railroad switch laid in a railway track uses at least a first machining aggregate with a machining tool held on a machining vehicle. For the purpose of reprofiling, the switch blade to be reprofiled is arranged at a distance to a stock rail interacting therewith in a transverse direction, thereby forming a gap. A counterhold held on the machining vehicle is positioned in the gap, wherein during profiling the machining vehicle is guided along the switch blade and the latter is pressed onto the counterhold by the machining tool and supported there.

16 Claims, 2 Drawing Sheets

Figure 1:
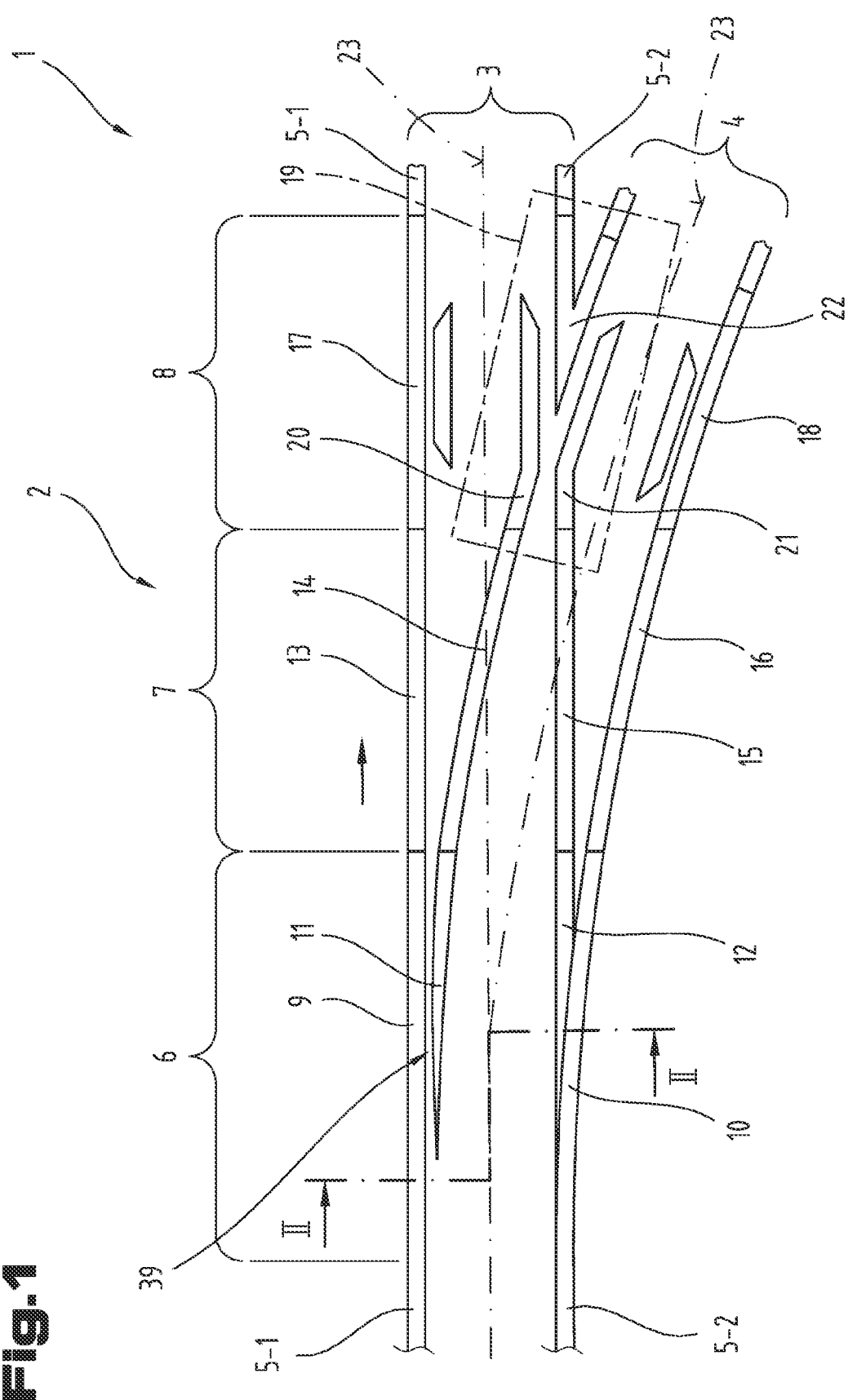

(51) Int. Cl.

| | |
|---|---|
| *B23C 3/00* | (2006.01) |
| *E01B 31/18* | (2006.01) |
| *E01B 7/00* | (2006.01) |
| *E01B 31/17* | (2006.01) |

(52) U.S. Cl.

CPC ............. *B23C 2215/32* (2013.01); *E01B 7/00* (2013.01); *E01B 31/17* (2013.01); *Y10T 409/303808* (2015.01); *Y10T 409/306384* (2015.01)

(58) Field of Classification Search

CPC ... Y10T 409/303808; Y10T 409/50082; Y10T 409/501312; Y10T 409/50164; B23C 1/007; B23C 1/20; B23C 3/005; B23C 2215/32; B23D 1/006; B01B 31/13

USPC ....... 409/178, 179, 131, 132, 293, 296, 298; 451/347

See application file for complete search history.

(56) References Cited

U.S. PATENT DOCUMENTS

| | | | | |
|---|---|---|---|---|
| 6,746,307 | B2 | 6/2004 | Knoll et al. | |
| 6,981,907 | B1 * | 1/2006 | Korinek ................ | B24B 19/004 |
| | | | | 451/63 |
| 9,416,498 | B2 | 8/2016 | Knoll | |
| 2013/0090041 | A1 | 4/2013 | Skoblenick | |
| 2013/0318762 | A1 * | 12/2013 | Knoll ..................... | E01B 31/12 |
| | | | | 29/284 |

FOREIGN PATENT DOCUMENTS

| | | | |
|---|---|---|---|
| DE | 202016005093 | U1 | 1/2017 |
| EP | 1820902 | A1 | 8/2007 |
| JP | 2014129685 | A | 7/2014 |
| RU | 2578629 | C1 | 3/2016 |
| WO | 02/06587 | A1 | 1/2002 |
| WO | 2012/061864 | A1 | 5/2012 |

* cited by examiner

METHOD FOR REPROFILING AT LEAST ONE SWITCH BLADE IN POINTS LAID IN A RAILWAY TRACK

CROSS REFERENCE TO RELATED APPLICATIONS

This application is the National Stage of PCT/AT2022/060124 filed on Apr. 19, 2022, which claims priority under 35 U.S.C. § 119 of Austrian Application No. A50294/2021 filed on Apr. 21, 2021. The international application under PCT article 21(2) was not published in English.

The invention relates to a method for reprofiling at least one switch blade in a railroad switch laid in a railway track.

Rails laid in a track are naturally exposed to wear which is predominantly caused by the contact forces between the rails and the wheels of the railway vehicles moving thereon. The resulting undesired changes to the rail cross section are subjected to a reprofiling method on a regular basis or as required. The reprofiling is thereby predominantly performed using cutting machining methods such as grinding, planing or milling, wherein these machining methods are performed either on disassembled rails or by means of rail-guided machining vehicles on laid tracks.

EP 1 820 902 A1 from the same applicant proposes a method for milling rail heads of railway tracks in a bedding by means of a movable milling device. The milling device comprises a rotationally driven milling cutter head which is mounted in a chassis containing a milling cutter head drive. The milling cutter head is guided perpendicularly and/or laterally along the railhead to be machined by guide means, wherein the milling cutter head has a plurality of cutter head blade sets arranged one behind the other in the circumferential direction of the milling cutter head. Each set of cutter head blades reconstructs the shape of the profile of the rail head to be shaped in approximately circular partial arcs of various radii. For the machining in particular of displaceable rail parts relative to the fixed rails, such as switch blades on railroad switches, the switch blades were placed against the respective rail when viewed in transverse direction, where necessary by positioning a shim beneath the raised switch blade and subsequently performing the reprofiling procedure together with the rail. Either the switch blade rail had to be raised or lifted, or the entire switch blade rail could not be machined without damaging the stock rail.

A method for reprofiling a rail is known from WO 02/06587 A1, for instance. A track-guided machining vehicle is disclosed therein with which the running surface of a rail, which substantially comprises the driving surface and the driving edge, is returned or brought close to its target profile by means of peripheral milling and where necessary a grinding process.

The target profile of rails can be restored in a short time and in an efficient manner with such a method and such a machining vehicle, however their use was only possible on continuous track sections, whilst reprofiling on track sections with interruptions in the rails, such as in the vicinity of railroad switches or intersections, is frequently performed with manually guided machining tools or small special devices, meaning that due to the high amount of manual work the reprofiling of tracks in the vicinity of railroad switches or intersections still leads to longer closure times and thus longer impediments of rail transport with correspondingly high resulting costs.

The object of the present invention was to overcome the disadvantages of the prior art and provide a method for reprofiling at least a switch blade which is simpler to perform and with which damages to the respective interacting stock rails can be avoided.

This object is solved by a method according to the claims. The method serves to reprofile at least one switch blade of a railroad switch laid in a railway track by means of at least a first machining aggregate which is held on a machining vehicle and is adjustable relative thereto, with a first machining tool, whereby the following steps are performed: At least the following method steps are to be performed or provided for in the performance of the method:

travelling on the laid rails of the railway track with the machining vehicle into the area outside of the railroad switch to be profiled, spaced arrangement of the switch blade to be reprofiled from the stock rail of the rails which interacts with the switch blade in transverse direction with respect to a track axis defined by the railway track and thereby the formation of a gap extending in the direction of the track axis between the stock rail and the switch blade to be reprofiled, conveyance of the machining vehicle with its at least first machining tool to the switch blade to be reprofiled, positioning and conveyance of at least one counterhold held on the machining vehicle within the gap formed between the stock rail and the switch blade to be reprofiled, performance of a first profiling machining step by reprofiling on the switch blade to be reprofiled whereby the at least first machining aggregate with its first machining tool is guided along the switch blade to be reprofiled, and pressing the switch blade to be reprofiled against the counterhold during profiling by means of at least a first machining tool and supporting the switch blade to be reprofiled on the counterhold in a transverse direction with respect to the track axis.

In the method steps selected herein, it is advantageous that by providing for the at least one counterhold which is positioned in the gap between the switch blade to be machined and the respective partial rail section, namely the stock rail, a transverse stabilisation of the switch blade can be achieved for profiling. The machining forces exerted by the machining tool during profiling are hereby transferred to the machining vehicle by the at least one counterhold. Direct contact or support of the respective switch blade on the interacting stock rail can thereby be reliably avoided. Furthermore, due to the spaced arrangement and the resulting formation of a gap, unintentional machining or damage of the stock rail by the machining tool performing the profiling of the switch blade can be prevented.

A method variation according to which the at least one counterhold is also guided along the switch blade to be reprofiled during profiling of the switch blade to be reprofiled is also advantageous. A secure and constant lateral support of the switch blade along the longitudinal extension can thereby be achieved at the at least one counterhold.

Furthermore, a method according to which the switch blade to be reprofiled is supported during profiling on at least a sleeper positioned beneath it, where necessary by interposing a slide chair plate resting upon the at least one sleeper, is advantageous. Reliable load transfer of the machining force during machining can thereby be enabled.

A further advantageous method is characterized in that immediately following the first machining step by means of the first machining aggregate and its first machining tool, a further machining step is performed on the switch blade to be reprofiled by means of a further machining aggregate with its further machining tool. Fine machining to improve or increase the surface quality can then be performed following greater removal of material, such as a milling process.

A method variation according to which the profiling on the switch blade to be reprofiled is performed during the machining journey of the machining vehicle is also advantageous. The respective machining aggregate is thereby moved together with the machining vehicle in the direction of the longitudinal extension of the railway track during the machining journey. A height and/or transverse alignment of the machining aggregate can be performed additionally.

Another approach is characterized in that the profiling on the switch blade to be reprofiled is performed with stationary arrangement of the machining vehicle and relative displacement of the machining aggregate with its machining tool with respect to the machining vehicle. The respective machining aggregate can thereby be guided along the switch blade to be reprofiled by means of its own adjustment arrangements in the case of stationary positioning of the machining vehicle. An even more precise and even tracking of the machining tool on the switch blade to be machined can thereby be enabled.

Furthermore, a method in which the rails forming the railway track are first reprofiled, in particular their running surface, prior to commencement of the profiling machining steps on the switch blade to be reprofiled, is advantageous. The necessary removal of worn and/or damaged and defective rail material is performed during reprofiling in reciprocal height alignment between the stock rail and the switch blade. It can also be necessary to machine the switch blade or stock rail more in the vertical direction.

Another method is characterized in that the rails forming the railway track are machined outside of the railroad switch.

A method variation according to which at least individual partial rail sections of the rails are reprofiled within the railroad switch, in particular the stock rail, the closure rail, the frog with the wing rail and where necessary the frog tip, is also advantageous.

A further advantageous method is characterized in that the reprofiling of the rails as well as the reprofiling of the switch blade to be reprofiled are each performed with the same machining aggregates. The engineering effort can thereby be kept lower. Moreover, the machine size of the machining vehicle can also be kept smaller and thus more economical.

A method variation according to which the machining aggregate or the machining aggregates are displaced from the respective rail to the switch blade to be reprofiled for the performance of the reprofiling of the switch blade to be reprofiled, is also advantageous. This can be performed by means of separate guide and/or adjustment arrangements. The respective alignment for the profiling can be performed by touch sensors in order to achieve correct reprofiling.

Another method is characterized in that the reprofiling of the switch blade to be reprofiled and the reprofiling of the rails is performed by means of machining tools which differ from one another with respect to their working profile. The respective machining aggregate can thus be equipped with the predetermined machining tool, for instance by means of a tool change.

Furthermore, a method is advantageous according to which the reprofiling of the switch blade to be reprofiled and the reprofiling of the rails are each performed by means of machining aggregates which are independent of one another and are specifically intended for said task. An otherwise required tool change can thus be foregone and the total machining time thereby reduced.

For a better understanding of the invention, it is explained in more detail with reference to the following figures.

Figure 2:
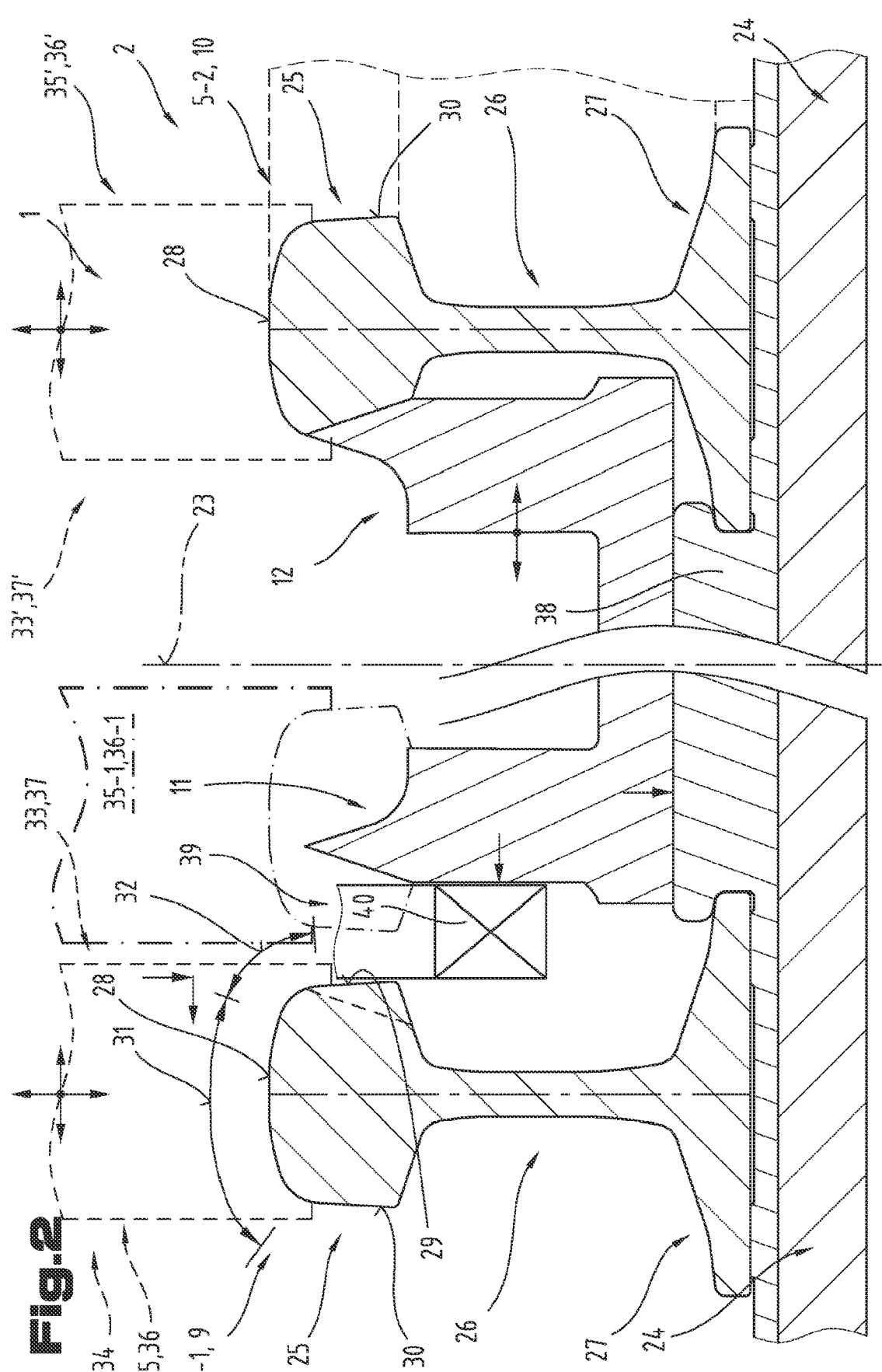

These show in significantly simplified, schematic representation:

FIG. 1 a partial section of a railway track with a railroad switch, without machining vehicle, in top view;

FIG. 2 a cross section of a railway track according to line II-II in FIG. 1, in an enlarged view.

It is worth noting here that the same parts have been given the same reference numerals or same component configurations in the embodiments described differently, yet the disclosures contained throughout the entire description can be applied analogously to the same parts with the same reference numerals or the same component configurations. The indications of position selected in the description, such as above, below, on the side etc. refer to the figure directly described and shown, and these indications of position can be applied in the same way to the new position should the position change.

Hereinafter, the term "in particular" is understood that it can relate to a possible special configuration or more precise specification of a subject matter or method step, but does not necessarily constitute an essential, preferred embodiment of the same or an essential procedure.

In their present use, the terms "comprising", "has", "having", "includes", "including", "contains", "containing" and all variations thereof do not cover a non-exclusive inclusion.

The terms "optionally" or "where necessary" can also be used. It is thereby understood that this method step or their system component is fundamentally present, however depending on the conditions of use can, but need not necessarily, be deployed.

FIGS. 1 and 2 show a partial section of the railway track 1 in the area or in a section of a railroad switch 2. The railway track 1 can also be referred to simply as a track which accommodates or is configured to allow for the rail-bound movements of vehicles and where applicable their attached carriages.

The rail section of the railroad switch 2 shown here as an example in FIG. 1 which has an almost completely straight longitudinal path can be referred to as the main track 3 and the rail section branching off laterally from the main track 3 can be referred to as the side track 4. The side track 4 branches off to the right of the main track 3 here. It should be noted that the example embodiment of the railroad switch 2 as shown here is just one of many possible example embodiments and the general term railroad switch can also denote, for example, multiple railroad switches, curved railroad switches or the like.

The simple railway track 1 or track comprises a left rail 5-1 and a right rail 5-2 corresponding to the arrows pointing left or right in FIG. 1. The railroad switch 2 itself comprises a switch blade section 6, a closure rail section 7 and a frog section 8 when viewed in the direction of its longitudinal extension and in the direction of the arrow. The individual sections are represented by means of dimension arrowheads. The railroad switch 2 further comprises the following individual components or rail components. In the area of the switch blade section 6 these are a straight or linearly configured left stock rail 9, a right stock rail 10 positioned opposite thereto and with a curved configuration, a left switch blade 11 and a straight or linearly configured right switch blade 12. The switch blades 11, 12 can also be referred to as switch rails.

In the area of the closure rail section 7 these are a straight or linearly configured left closure rail 13, a curved left closure rail 14, a straight or linearly configured right closure rail 15 and a curved right closure rail 16. Finally, in the area of the frog section 8 these are, amongst others, a straight or linearly configured left check rail 17 and a right check rail 18. The left check rail 17 is hereby a component of the left rail 5-1 and the right check rail 18 forms the continuation of the right rail 5-2 of the branching off side track 4. What is known as a frog 19, represented with a border within a rectangle shown by a dashed line, comprises a left wing rail 20, a right wing rail 21 and a frog tip 22. It should be noted that the previously described, linearly configured rail sections can also have a curved longitudinal path, as is known from curved railroad switches, for example.

The respectively coherent rails 5-1 and 5-2 are arranged running parallel to each other spaced at what is termed a gauge, and define a track axis 23 running between. This applies both to the longitudinal path of the main track 3 and to the side track 4. The track axis 23 forms a central axis, where a vertically aligned central plane can also run therein which then forms the vertical plane if the rails 5-1 and 5-2 are also arranged in the same horizontal plane.

In the case of a left configuration of the railroad switch 2, the aforementioned rail sections or rail parts are arranged symmetrically. The function of the listed rail sections and individual components, as well as their interaction with the wheels or a rail vehicle, shall not be elaborated upon here because they are familiar to the person skilled in the art.

FIG. 2 shows a clearer representation with a magnified cross section through the railway track 1 with the two rails 5-1 and 5-2 in the switch blade section 6 of the railroad switch 2. The left rail 5-1 here is shown in its full cross section before the beginning of the left switch blade 11, whilst the right rail 5-2 is shown with the right switch blade 12 in contact therewith as is depicted by the cross-sectional lines in FIG. 1. The left switch blade 11 of the railroad switch 2 is moved away from the left rail 5-1 towards the right rail 5-2 when viewed in a transverse direction to enable unimpeded passage on the main track 3 and is thus represented in its position closer towards the track axis 23. This is also shown in FIG. 1.

Fundamentally, the rails 5-1 and 5-2 are fastened in preferably regular, usually short intervals on sleepers 24 made from concrete, steel, wood or plastic which are transverse to the track axis 23, whereby for the sake of clarity the fastening elements are not represented here.

Together with the fastenings and the bedding, the rails 5-1 and 5-2 of the railway track 1 form the superstructure of the railway line. Fundamentally, the rails 5-1, 5-2 shown and described here form linear supporting and guidance elements in rail transport and thus predetermined passage for the rail vehicles thereon. It should be noted that the cross section of the rails 5-1, 5-2 can be configured in a great number of different ways and this cross section has been chosen solely as an example.

When viewed in its full cross section, each of the rails 5-1, 5-2 comprises a rail head 25, a rail web 26 and a rail foot 27. The rail head 25 is supported by the rail web 26 and the rail foot 27 is directly or indirectly mounted to the sleeper 24 or another support or substrate.

The part of the rail head 25 that can be touched by the wheels of a rail vehicle is referred to as the running surface 28 in this context. The wheels with wheel flanges of the rail vehicles, not shown here, are each arranged on sides of the rails 5-1, 5-2 facing each other, wherein these are the sides that are facing the track axis 23 or track centre. The rail head

25 which is positioned outside the railroad switch 2 is limited laterally by an inner side surface 29 and an outer side surface 30 arranged opposite thereto. The profile section extending between the side surfaces 29 and 30 when viewed cross-sectionally can be referred to in the broadest terms as the running surface 28 of the rails 5-1, 5-2. The running surface 28 of each rail 5-1, 5-2 can be composed of a driving surface 31 and a driving edge 32. The driving surface 31 is thereby arranged to run along the upper side of the rail head 25, wherein the driving edge 32 forms the transition to the inner side surface 29 which is facing the track centre or track axis 23. In the area of the railroad switch 2, the inner side surface 29 is not physically present because it is a stock rail 9, 10. The wheel thus run along the intersection between the curved driving surface and the underflushing.

Over time, damages occur on the running surface 28 of laid rails 5-1, 5-2 such as corrosion, wear, cracks, driving surface defects such as ripples, waves, wheel skid spots, dimple formations, cross-sectional changes such as flattenings of cambered driving surfaces, burrs, beads and the like. The wear manifestations and/or damages which are substantially restricted to the outermost edge area of the running surface 28 can largely be rectified by means of one or more profiling machining steps by 'reprofiling' the rail 5-1, 5-2. A cutting machining method is usually used to remove the worn or damaged material of the rail head 25 on the surface of the rail 5-1, 5-2 and the machined rail head 25 is returned to the greatest extent possible to the target profile of the rail 5-1, 5-2.

During reprofiling machining of the rails 5-1, 5-2, transverse and/or height guidance of a machining tool 33, 33' as indicated with reference to the rails 5-1, 5-2 shall be performed relative to a machining vehicle 34 of which only one of its machining tools 33, 33' is partially indicated. Reference is hereby made to the detailed description in EP 1 820 902 A1. Where necessary, the inner profiling usually performed in the area of the inner side surface 29 can be transferred to an outer profiling performed on the outer side surface 30. Furthermore, the scanning process can also be performed on the respective other rail 5-2, 5-1 positioned opposite the one rail 5-1, 5-2.

The machining or remachining of the rails 5-1, 5-2 is performed by means of a machining vehicle 34 not shown in more detail here, which is preferably autonomously moved along the railway track 1 by a drive motor and by means of several wheels or sets of wheels formed by the wheels and supported on the rails 5-1, 5-2. The drive motor is thereby in drive connection with at least individual wheels. The machining vehicle 34 usually comprises a vehicle frame which can, for example, be configured as a box frame or ladder-type frame, or in another shape. Furthermore, depending on the machining method, several machining aggregates can be provided with the respective machining tools. Thus, a first machining aggregate 35, 35' and where necessary at least a second or further machining aggregate 36, 36' downstream thereof when viewed in machining direction can be arranged on each of the rails 5-1, 5-2. A reverse arrangement when viewed in machining direction would, however, also be conceivable. Since one of the machining aggregates 35, 35' and/or 36, 36' can be provided on each of the two rails 5-1, 5-2, they have been denoted with the same reference numeral, however with an inverted comma for slight distinction.

The first machining aggregate 35 can be configured as a milling aggregate, for example, where its machining tool 33 can be configured as a peripheral milling tool, for instance. The milling tool can, for example, be equipped with a plurality of preferably exchangeable indexable inserts. The possible further machining aggregate 36 with its at least one further or second machining tool 37 can, for example, comprise a grinding tool in order to achieve a sufficiently high surface quality of the respective rail 5-1, 5-2.

Instead of the cutting second machining method, it would, however, also be conceivable to select or equip the further or second machining aggregate 36 with at least one machining tool 37 with which the surface quality is increased or improved, without however removing any further material. This could be performed by means of a material reshaping method, such as a roller method or the like.

Usually, specific machining aggregates 35, 35', 36, 36' are intended for each of the rails 5-1, 5-2 to be machined. This allows for both adjacent rails 5-1, 5-2 to be machined and reprofiled simultaneously during one machining journey. For the sake of better clarity, only parts of the machining aggregates 35, 35', 36, 36' positioned behind one another in the area of the two rails 5-1, 5-2 are indicated here.

The reprofiling of at least the switch blade 11, 12 is also performed during rail reprofiling. The switch blades 11, 12 are in alternating contact with one of the rails 5-1, 5-2 as per the selected railroad switch position. The left switch blade 11 can thus be in contact with the left rail 5-1, namely on its left stock rail 9, or the right switch blade 12 can be in contact with the right rail 5-2, namely on its right stock rail 10, as is well known in the art.

In order to also be able to absorb the compression forces applied in approximately vertical or in vertical travel mode to the respective switch blade 11, 12, each of the switch blades 11, 12 is supported on the rail bedding, in particular on at least one of the sleepers 24, wherein this can, however, preferably be performed by interposing at least one so-called slide chair plate 38. It is thus possible to position each of the switch blades 11, 12 such that it is transversely displaceable with respect to the track axis 23 and to transfer the force from the respective switch blade 11, 12 to the rail bedding, in particular to at least one of the sleepers 24. The slide chair plate 38 can also extend in a transverse direction beneath the rails 5-1, 5-2, namely its stock rails 9, 10. An even better height alignment of the respective stock rail 9, 10 and the corresponding switch blade 11, 12 can thereby be achieved.

During reprofiling machining, this is preferably performed first on the respective coherent rails 5-1, 5-2 of the railway track 1. The rails 5-1, 5-2 which form the railway track 1 are thereby reprofiled first, namely in particular their running surface 28 as is known in the art. Subsequently, at least the switch blades 11, 12 to be reprofiled of the railway track 1 are similarly subjected to reprofiling machining. Preferably, the rails 5-1, 5-2 which form the railway track 1 can be reprofiled outside the railroad switch 2 and/or at least also individual rail sections of the rails 5-1, 5-2 within the railroad switch 2. The rail sections can be the following aforementioned rail parts, namely those selected from the group of the stock rails 9, 10, the closure rails 13, 14, 15, 16, and where applicable the frog 19 with the wing rail 20, 21 and where applicable the frog tip 22. The two check rails 17, 18 could, however, also be reprofiled.

This previously described reprofiling machining on the respective coherent rails 5-1, 5-2 can be performed, but need not necessarily be performed prior to the profiling of the switch blades 11, 12. The reprofiling machining at least of the switch blades 11, 12 is also performed on the laid railway track 1 in the area of the railroad switch 2 by means of at least a first machining aggregate 35, which can be adjustably held relative to the machining vehicle 34, with its first machining tool 33. The tool in question can be the afore-mentioned milling tool, for instance.

Travel along the railway track 1 with the machining vehicle 34 thus occurs on the laid rails 5-1, 5-2 up into the area outside of the railroad switch 2 to be reprofiled. The similarly aforementioned reprofiling of at least one of the rails 5-1, 5-2 can thereby already be performed. It would also be possible or is further preferable that reprofiling machining is performed on at least individual rail sections of the aforementioned rail sections prior to commencement of switch blade machining.

If the machining vehicle 34 is still in an area outside the railroad switch 2, the switch blade 11 or 12 to be reprofiled shall be adjusted or positioned at a lateral distance to the respective interacting stock rail 9 or 10 of the respective rail 5-1 or 5-2. This spaced arrangement is performed in a transverse direction with respect to the track axis 23 defined by the railway track 1. A gap 39 which extends in the direction of the track axis 23 is thereby formed between the stock rail 9, 10 and the switch blade 11, 12 to be reprofiled.

It would, however, further be possible for the machining vehicle 34 to already be in a position on the railroad switch 2 such that an unimpeded adjustment of the switch blades 11, 12 is possible and that the machining vehicle 34 is on the track—namely the main track 3 or the side track 4—with which the switch blade 11 or 12 is in contact to allow correct passage through the railroad switch 2 on the respective stock rail 9 or 10. The switch blade 11 or 12 to be reprofiled would then already be positioned at a distance from the respective stock rail 9 or 10.

Depending on the relative position of the machining vehicle 34 with respect to the switch blade 11, 12 to be reprofiled, the machining vehicle 34 with its at least one machining tool 33 shall be positioned or conveyed to the respective switch blade 11, 12 to be reprofiled. It should be noted that the profiling described hereinafter with the machining aggregate(s) 35, 36 on what here is the left rail 5-1 is analogously transferable to the machining aggregate(s) 35', 36' in the area of what here is the right rail 5-2.

Once the positioning has been performed, at least one counterhold 40 held on the machining vehicle 34 is moved or placed within the gap 39 formed between the stock rail 9 or 10 and the switch blade 11 or 12 to be reprofiled. The counterhold 40 is then brought into contact with the switch blade 11, 12 to be reprofiled on their sides facing each other, thereby establishing a mutual contact. During this contact-ing, either the counterhold 40 can be positioned onto the switch blade 11, 12 or the switch blade 11, 12 can be positioned onto the counterhold 40.

The counterhold 40 is configured such that it is suited to absorbing compression forces and/or torques which are transferred via the respective switch blade 11, 12 supported thereon to the counterhold 40 and then subsequently passed on to the machining vehicle 34, in particular to its vehicle frame. This occurs on a mechanical basis, whereby the stability is to be ensured by corresponding dimensioning. The counterhold 40 can also be arranged and held on one of the machining aggregates 35, 35', 35-1, 36, 36', 36-1 and thus also on the machining vehicle 34.

At the same time as or subsequently to that, a positioned alignment is performed of the at least first machining aggregate 35, 35' with its first machining tool 33, 33' with respect to the switch blade 11, 12 to be reprofiled. The first machining tool 33, 33' can already be put into operation during the positioned alignment or subsequently thereto, as this is generally considered to be known. To carry out the profiling, the now operational at least one machining tool 33, 33' is put into contact with the switch blade 11 or 12 to be reprofiled. The performance of the first reprofiling machining step on the switch blade 11 or 12 can then be commenced, in which the at least first machining aggregate 35, 35' with its first machining tool 33, 33' is guided along the switch blade 11 or 12 to be reprofiled.

During profiling, the switch blade 11 or 12 to be reprofiled is pressed against the counterhold 40 by means of at least a first machining tool 33, 33'. The switch blade 11 or 12 to be reprofiled is thereby supported in transverse direction with respect to the track axis 23 on the counterhold 40 and thus held in position. An unintended collision of the at least first machining tool 33, 33' with the stock rail 9 or 10 located laterally adjacent can thus be reliably prevented during profiling.

Preferably, during profiling the at least one counterhold 40 is also guided along the switch blade 11 or 12 to be reprofiled. This can occur or be performed with the first machining aggregate 35, 35', in particular with its first machining tool 33, 33'.

During profiling of the switch blade 11 or 12 to be reprofiled, it is subjected to a compression force from the at least first machining tool 33, 33', wherein the machining aggregate(s) 35, 35', 36, 36' is/are supported on the machining vehicle 34. In those machining vehicles 34 which perform profiling on the laid railway track 1, the vehicle's own mass usually represents the maximum possible compression force that can be applied, although this is preferably selected to be lower.

Depending on the cross-sectional profile, in particular of the first machining tool 33, 33' configured as a milling wheel, in addition to the compression force component which is directed in the direction of the railway line bedding, in particular in the direction of the sleeper 24 carrying or supporting the rails 5-1, 5-2, a further compression force component is applied in transverse direction with respect to the track axis 23. Preferably, this further compression force component is directed towards the side not facing the track axis 23. The two compression force components are indicated with arrows on the simplified schematic representation of the machining tool 33, here on the left rail 5-1.

If the switch blade 11 or 12 is subjected to profiling, the applied transverse force component is absorbed by the contact and support on the counterhold 40 and ultimately transferred to the machining vehicle 34 which itself is supported on the rails 5-1, 5-2 in a transverse direction with respect to the track axis 23.

For profiling, the respective switch blade 11 or 12 is thus further held at a distance from its interacting stock rail 9 or 10 by means of the counterhold 40. The previously formed gap 39 can be maintained more or less unchanged, at least during profiling. The usually or predominantly vertically acting compression force component applied to the switch blade 11 or 12 to be reprofiled is transferred to the slide chair plate 38 if provided, but at least to a sleeper 24 located beneath it, and is thus supported by the at least one sleeper 24. It is thus possible to perform profiling on the respective switch blade 11 or 12 in a simple manner in its unchanged vertical position without it having to be raised in the direction or to the side facing away from the sleeper 24 to avoid undesired damages to the respectively immediately adjacent rail 5-1, 5-2 or its rail sections.

Depending on the configuration and mounting of the switch blade 11, 12, it was thus far necessary to raise the entire unit by a certain amount in order to be able to perform the machining without contact with the laterally adjacent rail section parts. This is, however, no longer required for profiling according to the invention. The two compression force components are indicated by arrows extending from the left switch blade 11 towards the counterhold 40 and the slide chair plate 38.

In addition, it would also be possible to perform a further machining step as is also preferably performed for the profiling of the rails 5-1, 5-2 to increase or improve the surface quality, including that of the respective switch blade 11, 12. If this is provided for, immediately following the first machining step by means of the first machining aggregate 35, 35' and its first machining tool 33, 33', a further or second machining step can be performed on the switch blade 11 or 12 to be reprofiled by means of the further machining aggregate 36, 36' with its further machining tool 37, 37'.

The profiling on the switch blade 11 or 12 to be reprofiled can be performed during the machining journey of the machining vehicle 34, wherein the machining vehicle 34 moves relative to the railway track 1, preferably autonomously. It would, however, also be possible for the profiling of the switch blade 11, 12 to be reprofiled to be performed with stationary arrangement of the machining vehicle 34 with respect to the railway track 1 and relative displacement of the machining aggregate 35, 36, 35', 36' with its machining tool 33, 37, 33', 37' with respect to the machining vehicle 34.

As previously described, the profiling can preferably first be performed on the rails 5-1, 5-2 outside the railroad switch 2 and then the further profiling is preferably performed on those rail sections in the railroad switch 2 with a stationary arrangement. The machining aggregates 35, 36, 35, 36' previously used for profiling of the rails 5-1, 5-2 can be used for profiling of the switch blade 11, 12. It is thereby possible to perform profiling of the rails 5-1, 5-2 and the switch blades 11, 12 with the same machining aggregates 35, 36, 35', 36'. In this case, to perform reprofiling of the switch blade 11, 12 to be reprofiled, the intended machining aggregate 35, 36, 35', 36' or intended machining aggregates 35, 36, 35', 36' shall be displaced from the respective rails 5-1, 5-2 to the switch blade 11, 12 to be reprofiled.

Depending on the profile or profile cross section to be machined, it can become necessary to perform the reprofiling of the switch blade 11, 12 and the reprofiling of the rails 5-1, 5-2 by means of distinctly configured machining tools 33, 37, 33', 37' with respect to their machining profile. In order to achieve this, a tool change of the machining tools 33, 37, 33', 37' can be carried out to be able to fulfil this requirement.

Depending on the machine size and equipment of the machining vehicle 34, the reprofiling of the switch blade 11, 12 to be reprofiled and the reprofiling of the rails 5-1, 5-2 could be performed by means of independent machining aggregates 35, 36 and 35-1, 36-1 specifically intended for such purpose. The machining aggregates 35, 36 could, for example, thus be used for profiling the rails 5-1, 5-2 and where applicable for the profiling of the stationary rail sections in the area of the railroad switch 2.

The additional machining aggregates 35-1, 36-1 can be used or deployed at least for profiling the switch blades 11, 12 and where necessary also for the profiling of at least individual rail sections of the frog 19. The additional machining aggregates 35-1, 36-1 can, where required, also be used on both sides and thus be provided next to each other for one of the rails 5-1, 5-2 each.

For the sake of completeness, it should be noted that the individual method steps and their temporal sequence need not necessarily occur in the stated order, but rather that a deviating temporal sequence is possible. Preferably, however, a step-by-step and thus consecutive temporal sequence of the method steps is performed.

The example embodiments show possible embodiment variations, although it is to be noted here that the invention is not limited to the specifically represented embodiment variations of the same, but rather various combinations of the individual embodiment variations with one another are possible, and that given the technical teachings provided by the present invention this variation possibility is within the ability of the skilled person in this technical field.

The scope of protection is defined by the claims. The description and the drawings should, however, be consulted when construing the claims. Individual features or combinations of features from the various example embodiments as shown and described can constitute separate inventive solutions. The problem to be solved by the individual inventive solutions can be derived from the description.

All value ranges specified in the current description are to be understood such that they include any and all sub-ranges, e.g., the specification 1 to 10 is to be understood such that all sub-ranges, starting from the lower limit 1 and the upper limit 10 are included, i.e., all sub-ranges begin with a lower limit of 1 or more and end at an upper limit of 10 or less, e.g., 1 to 1.7, or 3.2 to 8.1, or 5.5 to 10.

As a matter of form and by way of conclusion, it is noted that, to improve understanding of the structure, elements have partially not been shown to scale and/or enlarged and/or shrunk.

| List of reference numerals | |
| --- | --- |
| 1 | Railway track |
| 2 | Railroad switch |
| 3 | Main track |
| 4 | Side track |
| 5 | Rail |
| 6 | Switch blade section |
| 7 | Closure rail section |
| 8 | Frog section |
| 9 | Left stock rail |
| 10 | Right stock rail |
| 11 | Left switch blade |
| 12 | Right switch blade |
| 13 | Left closure rail |
| 14 | Left closure rail |
| 15 | Right closure rail |
| 16 | Right closure rail |
| 17 | Left check rail |
| 18 | Right check rail |
| 19 | Frog |
| 20 | Left wing rail |
| 21 | Right wing rail |
| 22 | Frog tip |
| 23 | Track axis |
| 24 | Sleeper |
| 25 | Rail head |
| 26 | Rail web |
| 27 | Rail foot |
| 28 | Running surface |
| 29 | Inner side surface |
| 30 | Outer side surface |
| 31 | Driving surface |
| 32 | Driving edge |
| 33 | Machining tool |
| 34 | Machining vehicle |
| 35 | First machining aggregate |
| 36 | Second machining aggregate |
| 37 | Machining tool |
| 38 | Slide chair plate |
| 39 | Gap |
| 40 | Counterhold |

The invention claimed is:

1. A method for reprofiling at least one switch blade (11, 12) of a railroad switch (2) laid in a railway track (1), the reprofiling being carried out by means of at least a first machining aggregate (35, 35') held on a machining vehicle (34), the at least first machining aggregate being adjustable relative to the machining vehicle, the at least first machining aggregate comprising a first machining tool (33, 33'), the method comprising the following steps:

travelling on laid rails (5-1, 5-2) of the railway track (1) with the machining vehicle (34) up into an area outside of the railroad switch (2) to be reprofiled, arranging the at least one switch blade (11, 12) to be reprofiled so as to be spaced from a stock rail (9, 10) of the laid rails (5-1, 5-2) in a transverse direction with respect to a central longitudinal track axis (23) of the railway track (1) so as to form a gap (39) extending in the direction of the track axis (23) between the stock rail (9, 10) and the at least one switch blade (11, 12) to be reprofiled, conveyance of the machining vehicle (34) with its first machining tool (33, 33') to the at least one switch blade (11, 12) to be reprofiled, positioning and conveyance of at least one counterhold (40) held on the machining vehicle (34) to a location within the gap (39) formed between the stock rail (9, 10) and the at least one switch blade (11, 12) to be reprofiled, performance of a first machining step of the profiling by reprofiling on the at least one switch blade (11, 12) to be reprofiled whereby the at least first machining aggregate (35, 35') with its first machining tool (33, 33') is guided along the switch blade (11, 12) to be reprofiled, and during the profiling by means of at least the first machining tool (33, 33'), pressing the at least one switch blade (11, 12) to be reprofiled against the at least one counterhold (40) that is located in the gap (39) and supporting the at least one switch blade (11, 12) to be reprofiled on the at least one counterhold (40) in a transverse direction with respect to the track axis (23).

2. The method according to claim 1, wherein the at least one counterhold (40) is guided along the at least one switch blade (11, 12) to be reprofiled during the profiling of the at least one switch blade (11, 12) to be reprofiled.

3. The method according to claim 1, wherein the at least one switch blade (11, 12) to be reprofiled is supported during the profiling on at least a sleeper (24) positioned beneath the at least one switch blade (11, 12).

4. The method according to claim 1, wherein immediately following the first machining step by means of the at least first machining aggregate (35, 35') and its first machining tool (33, 33'), a further machining step is performed on the at least one switch blade (11, 12) to be reprofiled by means of a further machining aggregate (36, 36') with a further machining tool (37, 37').

5. The method according to claim 1, wherein the profiling on the at least one switch blade (11, 12) to be reprofiled is performed during a machining journey of the machining vehicle (34).

6. The method according to claim 1, wherein the profiling on the at least one switch blade (11, 12) to be reprofiled is performed with stationary arrangement of the machining vehicle (34) and relative displacement of the at least first machining aggregate (35, 36; 35', 36') with its first machining tool (33, 37, 33', 37') with respect to the machining vehicle (34).

7. The method according to claim 1, wherein prior to commencement of the profiling machining on the at least one switch blade (11, 12) to be reprofiled, the laid rails (5-1, 5-2) forming the railway track (1) are first reprofiled.

8. The method according to claim 7, wherein the reprofiling of the laid rails (5-1, 5-2) forming the railway track (1) occurs outside of the railroad switch (2).

9. The method according to claim 7, wherein the reprofiling of the laid rails (5-1, 5-2) includes reprofiling of at least individual partial rail sections within the railroad switch (2).

10. The method according to claim 7, wherein the reprofiling of the laid rails (5-1, 5-2) as well as the reprofiling of the at least one switch blade (11, 12) to be reprofiled are each performed with the same at least first machining aggregate (35, 36; 35', 36').

11. The method according to claim 10, wherein for the performance of the reprofiling of the at least one switch blade (11, 12) to be reprofiled, the at least first machining aggregate (35, 36; 35', 36') is displaced from the respective laid rail (5-1, 5-2) to the at least one switch blade (11, 12) to be reprofiled.

12. The method according to claim 7, wherein the reprofiling of the at least one switch blade (11, 12) to be reprofiled is performed by the first machining tool, and wherein the reprofiling of the laid rails (5-1, 5-2) is performed by means of a further machining tool which has a working profile that differs from a working profile of the first machining tool.

13. The method according to claim 7, wherein the reprofiling of the at least one switch blade (11, 12) to be reprofiled is performed by the at least first machining aggregate, and wherein the reprofiling of the laid rails (5-1, 5-2) is performed by means of a further machining aggregate.

14. The method according to claim 7, wherein the reprofiling of the laid rails (5-1, 5-2) includes reprofiling of at least one individual partial rail section within the railroad switch (2), the at least one individual partial rail section including one or more of: a stock rail (9, 10), a closure rail (13, 14, 15, 16), a frog (19) with a wing rail (21), and a frog tip (22).

15. The method according to claim 1, wherein the at least one switch blade (11, 12) to be reprofiled is supported during the profiling on at least one sleeper (24), wherein a slide chair plate (38) resting upon the at least one sleeper (24) is interposed between the at least one switch blade (11, 12) to be reprofiled and the at least one sleeper (24).

16. The method according to claim 1, wherein prior to commencement of the profiling machining on the at least one switch blade (11, 12) to be reprofiled, a running surface (28) of the laid rails (5-1, 5-2) forming the railway track (1) is first reprofiled.

* * * * *